UNITED STATES PATENT OFFICE 2,279,875

ACCELERATOR OF VULCANIZATION

Waldo L. Semon, Silver Lake, Ohio, assignor to The B. F. Goodrich Company, New York, N. Y., a corporation of New York No Drawing. Application May 12, 1938, Serial No. 207,523

25 Claims. (Cl. 260—792)

This invention relates to the vulcanization of rubber and has as its particular object to provide new and improved accelerators of vulcanization.

The method of this invention consists in heating rubber in the presence of a vulcanizing agent such as sulphur and a member of the new class of accelerators, which class consists of mercaptoquinolines and substituted mercaptoquinolines.

The preferred compounds within the new class of accelerators are quinoline compounds containing the mercapto sulphur in the 2-position, that is to say attached to the carbon atom adjacent to the nitrogen of the quinoline, although like compounds containing the sulphur in other positions are not excluded from the scope of this invention. The preferred compounds accordingly include 2-mercaptoquinoline, which may be represented by the structural formula

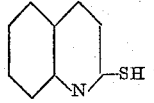

together with its salts and sulfides as well as similar compounds containing substituents which may be hydrocarbon groups such as methyl, ethyl, isopropyl, allyl, benzyl, cyclohexyl, phenyl, tolyl, naphthyl, anthryl, and other alkyl, aralkyl, cycloalkyl, and aryl groups; acyl groups such as acetyl, and benzoyl groups; oxy groups such as hydroxy, methoxy, ethoxy, phenoxy, anisyl, phenetyl, and other alkoxy and aryloxy groups; amino groups such as amino, methylamino, dimethylamino, anilino and other alkyl- and aryl-substituted amino groups; halogen groups; nitro groups; nitroso groups; or other groups on the quinoline nucleus. Salts of the mercaptoquinolines with metals such as sodium, potassium, zinc, lead, magnesium, and cadmium, and salts of the mercaptoquinolines with nitrogenous bases including salts with dimethylamine, aniline, diphenylamine, ethylene diamine, and other aliphatic and aromatic primary and secondary amines; quaternary ammonium salts such as methyl hexamethylenetetrammonium, benzyl hexamethylenetetrammonium, 2-benzothiazyl hexamethylenetetrammonium, N-methyl pyridinium, N-methyl acridinium, N-benzyl quinolinium, tetramethylammonium, benzyltrimethylammonium, benzyl tri(beta-hydroxyethyl)-ammonium, and phenyltrimethylammonium compounds; sulfonium salts; salts with guanidines such as diphenyl guanidine; salts with hydrazines such as phenyl hydrazine; salts with aldehyde amines; etc. are also accelerators.

Useful accelerators are also formed by preparing the sulfides of the mercaptoquinoline such as di-2-quinolyl monosulfide, di-2-quinolyl disulfide, di-2-quinolyl tetrasulfide, di(4-methyl 5-amino 2-quinolyl) disulfide, etc. The term "mercaptoquinoline" when preceded by an article is herein used in a generic sense to designate unsubstituted and nuclear-substituted compounds, but when used alone signifies a compound containing no nuclear substituents except the mercapto group.

The mercaptoquinolines are extraordinarily active materials, and may usually be used to replace much higher amounts of other accelerators with equivalent results. In order to illustrate the activity of the accelerators of this invention, they were compared with 2-mercaptobenzothiazole, an active accelerator in wide commercial use. The following composition was pre-prepared:

| | |
|---|---|
| Rubber | 100 |
| Zinc oxide | 10 |
| Blanc fixe | 40 |
| Stearic acid | 1 |
| Sulfur | 3.5 |

Various proportions of different accelerators were mixed with the above composition and the resulting batches were cured, the tensile strengths obtained being recorded below:

| Accelerator | Cure | | Tensile strength in lbs./sq. in. |
|---|---|---|---|
| | Time in minutes | Temp., °F. | |
| 2-mercaptobenzothiazole, 0.5 part | 30 | 275 | 3,258 |
| | 60 | 275 | 3,105 |
| 2-mercaptoquinoline, 0.5 part | 30 | 275 | 3,990 |
| | 60 | 275 | 3,656 |
| 2-mercaptoquinoline, 0.25 part | 30 | 275 | 3,757 |
| | 60 | 275 | 3,950 |
| Di-2-quinolyl disulfide, 0.25 part | 30 | 275 | 3,850 |
| | 60 | 275 | 4,095 |
| Zinc salt of 2-mercaptoquinoline, 0.25 part | 30 | 275 | 3,590 |
| | 60 | 275 | 3,775 |
| Diphenyl guanidine salt of 2-mercaptoquinoline, 0.25 part | 30 | 275 | 4,230 |
| | 60 | 275 | 3,850 |
| 2-mercapto 4-methyl quinoline, 0.25 part | 30 | 275 | 3,730 |
| | 60 | 275 | 3,625 |
| 2-mercapto 4,6-dimethyl quinoline, 0.25 part | 30 | 275 | 3,655 |
| | 60 | 275 | 3,895 |

2-mercapto 4-methyl 5-aminoquinoline is another good accelerator within the scope of this invention. The following compositions were prepared:

|  | Composition | |
| --- | --- | --- |
|  | A | B |
| Rubber | 100 | 100 |
| Zinc oxide | 10 | 10 |
| Blanc fixe | 40 | 40 |
| Stearic acid | 1 | 1 |
| Sulfur | 1 | 1 |
| 2-mercapto-benzothiazole | 1 | 0 |
| 2-mercapto-4-methyl-5-aminoquinoline | 0 | 0.5 |

The tensile strengths obtained by curing these compositions are as follows:

| Composition | Cure | | Tensile strength in lb./sq. in. |
| --- | --- | --- | --- |
|  | Time in minutes | Temp., °F. |  |
| A | 10 | 287 | 3,105 |
| A | 15 | 287 | 3,000 |
| A | 30 | 287 | 2,880 |
| B | 10 | 287 | 2,740 |
| B | 15 | 287 | 2,985 |
| B | 30 | 287 | 3,565 |

It was found that compositions containing 2-mercapto 4-methyl 5-aminoquinoline were less subject to deteriorating by aging than compositions containing other accelerators of this invention.

It is to be understood that the specific examples given above are merely illustrative of one manner of the use of the accelerators of this invention; that other accelerators within the scope of the class herein defined may be substituted for the specific compounds used in the examples; that the accelerators of this invention may be used to vulcanize rubber in its generic sense including caoutchouc, balata, gutta-percha, synthetic rubber, or natural or artifically prepared latex; that the accelerator may be incorporated into the rubber by mastication or milling, or in the case of latex or other dispersion or solution, by simply dissolving or suspending therein; that the accelerators may be used in admixture with each other or other known accelerators, or with antioxidants, softeners, activators, retarders, pigments, fillers, etc., and that the rubber may be vulcanized with the assistance of this new class of accelerators in other manners than that particularly set forth above; specificially, it may be vulcanized in heated metal molds, in hot air, steam, hot water, etc. The accelerators of this invention may advantageously be used in as low a proportion as 0.5% of rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of a member of the class consisting of the mercaptoquinolines, their salts, and diquinolyl sulfides.

2. The process which comprises vulcanizing rubber in the presence of an alkyl 2-mercaptoquinoline.

3. The process which comprises vulcanizing rubber in the presence of an alkyl amino 2-mercaptoquinoline.

4. The process with comprises vulcanizing rubber in the presence of 2-mercapto 4-methyl aminoquinoline.

5. The process which comprises vulcanizing rubber in the presence of a diquinolyl sulfide.

6. The process which comprises vulcanizing rubber in the presence of di-2-quinolyl disulfide.

7. The process which comprises vulcanizing rubber in the presence of a salt of a mercaptoquinoline.

8. The process which comprises vulcanizing rubber in the presence of a salt of a 2-mercaptoquinoline and a nitrogenous base.

9. The process which comprises vulcanizing rubber in the presence of the diphenylguanidine salt of 2-mercaptoquinoline.

10. A rubber composition which has been vulcanized in the presence of a member of the class consisting of the mercaptoquinolines, their salts, and diquinolyl sulfides.

11. A rubber composition which has been vulcanized in the presence of an alkyl amino 2-mercaptoquinoline.

12. A rubber composition which has been vulcanized in the presence of 2-mercapto 4-methyl 5-aminoquinoline.

13. A rubber composition which has been vulcanized in the presence of a diquinolyl sulfide.

14. A rubber composition which has been vulcanized in the presence of di-2-quinolyl disulfide.

15. A rubber composition which has been vulcanized in the presence of a salt of a mercaptoquinoline.

16. A rubber composition which has been vulcanized in the presence of a salt of a 2-mercaptoquinoline and a nitrogenous base.

17. A rubber composition which has been vulcanized in the presence of the diphenylguanidine salt of 2-mercaptoquinoline.

18. The process of accelerating the vulcanization of rubber which comprises vulcanizing in the presence of a 2-mercapto quinoline.

19. The process of accelerating the vulcanization of rubber which comprises vulcanizing in the process of a mercapto quinoline.

20. The process of accelerating the vulcanization of rubber which comprises vulcanizing in the presence of a mercapto quinoline having a methyl substituent in the nucleus.

21. The process of accelerating the vulcanization of rubber which comprises vulcanizing in the presence of a mercapto quinoline having from zero to two nucleus hydrogen atoms replaced by methyl groups.

22. The vulcanizates prepared by vulcanizing rubber in the presence of a 2-mercapto quinoline.

23. The vulcanizates prepared by vulcanizing rubber in the presence of a mercapto quinoline.

24. The vulcanizates prepared by vulcanizing rubber in the presence of a mercapto quinoline having a methyl substituent in the nucleus.

25. The vulcanizates prepared by vulcanizing rubber in the presence of a mercapto quinoline having from 0 to 2 nucleus hydrogen atoms replaced by methyl groups.

WALDO L. SEMON.

CERTIFICATE OF CORRECTION.

Patent No. 2,279,875. April 14, 1942.

WALDO L. SEMON.

It is hereby certified that error appears in the printed specification of the above numbered patent requiring correction as follows: Page 2, first column, lines 10 to 15, in the table, line 6 thereof, for "2-mercapto-benzo-thiaxole" read --2-mercapto-benzothiazole--; line 59, for "0.5%" read --0.05%--; and second column, line 8, claim 4, for "aminoquinoline" read --5-aminoquinoline--; and that the said Letters Patent should be read with this correction therein that the same may conform to the record of the case in the Patent Office.

Signed and sealed this 1st day of September, A. D. 1942.

(Seal)

Henry Van Arsdale,
Acting Commissioner of Patents.